(12) United States Patent
Kanai et al.

(10) Patent No.: US 8,160,816 B2
(45) Date of Patent: Apr. 17, 2012

(54) VEHICULAR BEHAVIOR DETERMINATION DEVICE AND VEHICULAR BEHAVIOR DETERMINATION METHOD

(75) Inventors: Kazunori Kanai, Wako (JP); Ken Oiwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 909 days.

(21) Appl. No.: 12/196,060

(22) Filed: Aug. 21, 2008

(65) Prior Publication Data
US 2009/0062981 A1 Mar. 5, 2009

(30) Foreign Application Priority Data

Aug. 27, 2007 (JP) ................................ 2007-220081
Jul. 1, 2008 (JP) ................................ 2008-172630

(51) Int. Cl.
*G01C 21/00* (2006.01)
(52) U.S. Cl. ........ 701/504; 701/500; 701/505; 701/506; 701/507; 701/508
(58) Field of Classification Search ...................... 701/29, 701/33, 500, 504, 505, 506, 507, 508
See application file for complete search history.

(56) References Cited

U.S. PATENT DOCUMENTS

| | | | | |
|---|---|---|---|---|
| 4,908,767 A | * | 3/1990 | Scholl et al. ................... 701/505 |
| 5,172,323 A | * | 12/1992 | Schmidt ........................ 701/220 |
| 5,406,489 A | * | 4/1995 | Timothy et al. ................... 701/4 |
| 5,506,588 A | * | 4/1996 | Diefes et al. ............. 342/357.27 |
| 5,557,520 A | * | 9/1996 | Suissa et al. ..................... 701/29 |
| 5,850,197 A | * | 12/1998 | Schipper ........................ 342/417 |
| 6,308,134 B1 | * | 10/2001 | Croyle et al. ................. 701/220 |
| 7,058,488 B2 | * | 6/2006 | Kemp et al. ..................... 701/33 |
| 7,248,967 B2 | * | 7/2007 | Hagstedt ........................ 701/507 |
| 2005/0165528 A1 | * | 7/2005 | Sawahata ........................ 701/38 |
| 2006/0052917 A1 | * | 3/2006 | Schwarzhaupt et al. ........ 701/29 |
| 2006/0247854 A1 | * | 11/2006 | Esaki et al. .................... 701/210 |
| 2008/0133066 A1 | * | 6/2008 | Takenaka ........................ 701/1 |
| 2009/0088918 A1 | * | 4/2009 | Takenaka et al. ............... 701/29 |

FOREIGN PATENT DOCUMENTS

JP 9-42979 2/1997

* cited by examiner

Primary Examiner — Darnell Jayne
Assistant Examiner — Sasha T Varghese
(74) Attorney, Agent, or Firm — Nelson Mullins Riley & Scarborough LLP; Anthony A. Laurentano (57) ABSTRACT

According to a vehicular behavior determination device (100) of the present invention, an angular velocity vector $\omega(k)$ which represents an angular velocity around each of 3 axes of a vehicle (1) can be determined in high accuracy on the basis of a temporal variation mode of a posture vector $pst_i(k)$ (i=x, y, z) which represents a posture of the vehicle (1) in a global coordinate system in an attempt to curtail a manufacture cost and size of the vehicle (1) by avoiding the usage of a 3-axis gyro sensor which is relatively expensive in price and large in size.

5 Claims, 7 Drawing Sheets

VEHICULAR BEHAVIOR DETERMINATION DEVICE AND VEHICULAR BEHAVIOR DETERMINATION METHOD

BACKGROUND OF THE INVENTION

1. Field of the Invention

The present invention relates to a vehicular behavior determination device and a vehicular behavior determination method.

2. Description of the Related Art

There has been disclosed, for example, in Japanese Patent Publication No. 9-42979, a technology for displaying accurately a vehicular position of a vehicle on a map in a navigation device, which attempts to improve a determination accuracy of the vehicular position by getting rid of effects caused by a road inclination through calculating an inclined angle of the road where the vehicle is running on the basis of outputs from a vehicular velocity sensor and a 3-axis acceleration sensor, and thereafter correcting an output from a gyro sensor on the basis of the inclined angle calculated.

However, in order to determine accurately a behavior of the vehicle, it is necessary to determine an angular velocity and an angular acceleration around each of a roll axis and a pitch axis in addition to the angular velocity and the angular acceleration around a yaw axis. On the other hand, a 3-axis gyro sensor which is used to determine the angular velocity and the like around each of the 3 axes is relatively expensive in price and large in size. Therefore, it is disadvantageous to mount on the vehicle the relatively expensive and large-sized 3-axis gyro sensor from the viewpoint of curtailing the manufacture cost and reducing the size of the vehicle.

SUMMARY OF THE INVENTION

The present invention has been accomplished in view of the aforementioned problem, and it is therefore an objective of the present invention to provide a vehicular behavior determination device and a vehicular behavior determination method which can determine in high accuracy an angular velocity and the like around each of 3 axes of a vehicle in an attempt to curtail a manufacture cost and size of the vehicle by avoiding the usage of a 3-axis gyro sensor which is relatively expensive in price and large in size.

The vehicular behavior determination device which determines a behavior of a vehicle according to a first aspect of the present invention includes: a first arithmetic processor, which determines a parameter representing the behavior of the vehicle; a second arithmetic processor, which calculates a posture vector representing a posture of the vehicle in a global coordinate system on the basis of a determination result determined by the first arithmetic processor; and a third arithmetic processor, which calculates an angular velocity vector representing an angular velocity of the vehicle around each of 3 orthogonal axes in a vehicular coordinate system on the basis of a temporal variation mode of the posture vector calculated by the second arithmetic processor.

According to the vehicular behavior determination device of the first aspect of the present invention, the angular velocity vector which represents the angular velocity of the vehicle around each of the 3 orthogonal axes in the vehicular coordinate system is determined on the basis of the temporal variation mode of the posture vector which represents the vehicular posture in the global coordinate system. Therefore, the angular velocity around each of the 3 orthogonal axes of the vehicle can be determined in high accuracy in an attempt to curtail a manufacture cost and size of the vehicle by avoiding the usage of a 3-axis gyro sensor which is relatively expensive in price and large in size.

The vehicular behavior determination device according to a second aspect of the present invention is dependent on the first aspect of the present invention, wherein the second arithmetic processor calculates an $i^{th}$ posture vector (i=1, 2, 3) which represents a posture of each of the 3 orthogonal axes in the global coordinate system as the posture vector; and the third arithmetic processor obtains a rotational main axis vector which represents a direction of a rotational main axis in the global coordinate system by combining 3 rotational axis vectors for making a previous $i^{th}$ posture vector match with a current $i^{th}$ posture vector, calculates a first-order angular velocity vector which represents an angular velocity of the vehicle around each of the 3 orthogonal axes in the global coordinate system on the basis of the rotational main axis vector, the previous $i^{th}$ posture vector and the current $i^{th}$ posture vector, and thereafter calculates a second-order angular velocity vector which represents the angular velocity of the vehicle around each of the 3 orthogonal axes in the vehicular coordinate system as the angular velocity vector on the basis of the first-order angular velocity vector and the $i^{th}$ posture vector.

According to the vehicular behavior determination device of the second aspect of the present invention, due to the consideration of the rotational main axis for matching the previous posture of the vehicular coordinate system to the current posture of the vehicular coordinate system in the global coordinate system, it is possible to determine in high accuracy the angular velocity of the vehicle around each of the 3 orthogonal axes in the vehicular coordinate system.

The vehicular behavior determination device according to a third aspect of the present invention is dependent on the first aspect or the second aspect of the present invention, wherein the third arithmetic processor calculates an angular acceleration vector which represents an angular acceleration of the vehicle around each of the 3 orthogonal axes in the vehicular coordinate system on the basis of the temporal variation mode of the angular velocity vector.

According to the vehicular behavior determination device of the third aspect of the present invention, it is possible to determine in high accuracy the angular acceleration around each of the 3 orthogonal axes of the vehicle on the basis of the angular velocity around each of the 3 orthogonal axes of the vehicle determined in high accuracy without using the 3-axis gyro sensor as aforementioned.

The vehicular behavior determination method according to a fourth aspect of the present invention includes steps of: a first arithmetic processing for determining a parameter representing the behavior of the vehicle; a second arithmetic processing for calculating a posture vector representing a posture of the vehicle in a global coordinate system on the basis of a determination result determined by the first arithmetic processing; and a third arithmetic processing for calculating an angular velocity vector representing an angular velocity of the vehicle around each of 3 orthogonal axes in a vehicular coordinate system on the basis of a temporal variation mode of the posture vector calculated by the second arithmetic processing.

According to the vehicular behavior determination method of the fourth aspect of the present invention, similar to the vehicular behavior determination device of the first aspect of the present invention, it is possible to determine in high accuracy the angular velocity around each of the 3 orthogonal axes of the vehicle without using the 3-axis gyro sensor.

DETAILED DESCRIPTION OF THE PREFERRED EMBODIMENTS

Hereinafter, an embodiment of a vehicular behavior determination device and a vehicular behavior determination method of the present invention will be described with reference to the drawings. In the description below, a parameter with a subscript "g" denotes a parameter in a global coordinate system; similarly, a parameter with a subscript "c" denotes a parameter in a vehicular coordinate system.

Figure 1:
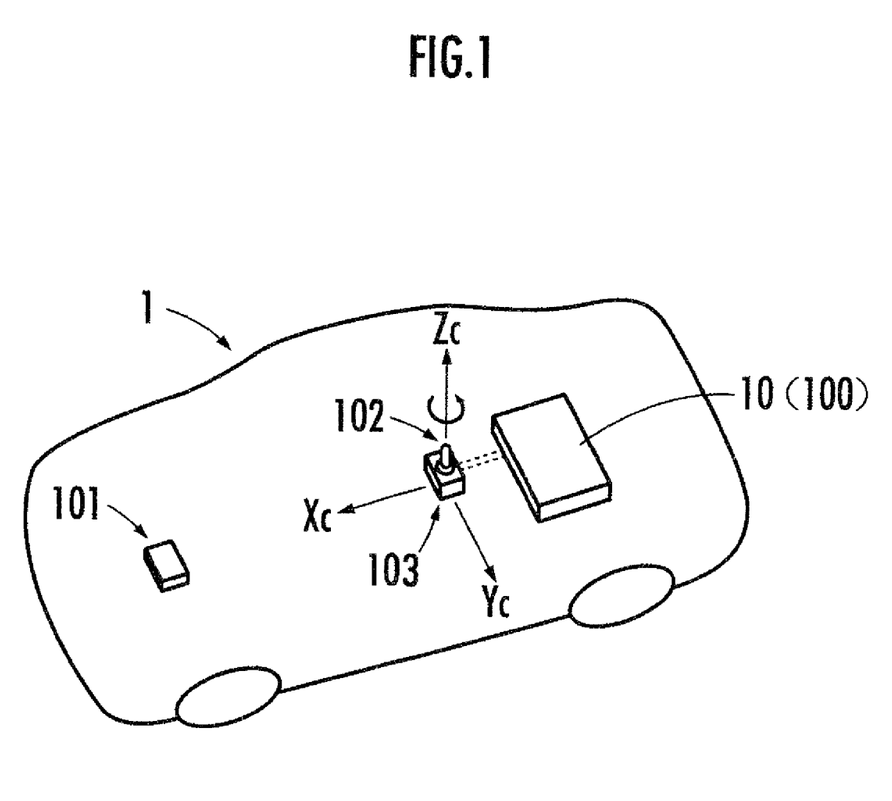
FIG. 1 is an explanatory diagram illustrating a configuration of a vehicular behavior determination device.
Figure 2:
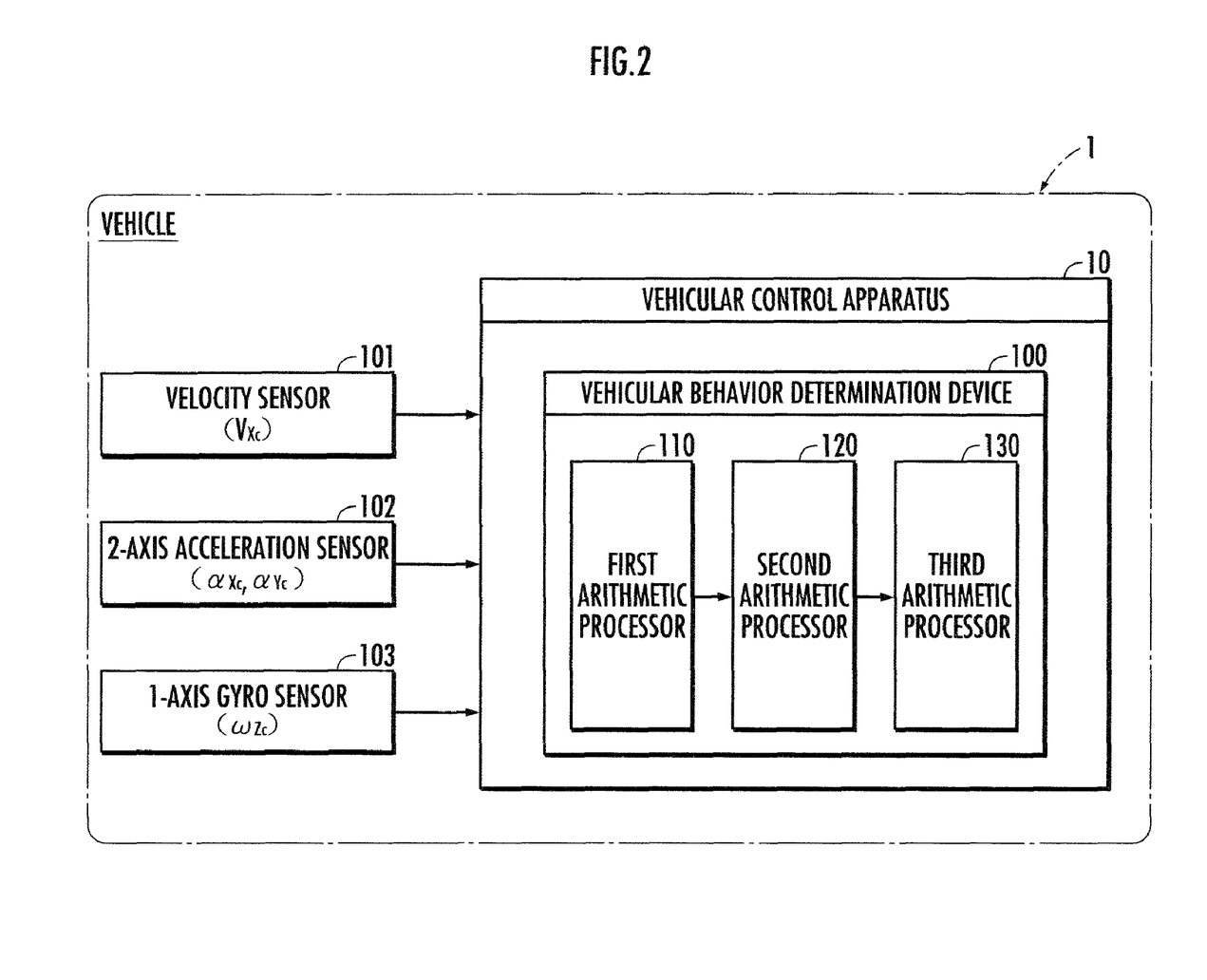
FIG. 2 is a block chart illustrating a configuration of the vehicular behavior determination device.

Explanations will be given firstly to the vehicular behavior determination device of a first embodiment. As illustrated in FIGS. 1 and 2, the vehicular behavior determination device 100 is constituted as a part of a vehicular control apparatus 10 which is mounted in a vehicle 1. The vehicular control apparatus 10 is constituted from a computer or ECU (Electronic Control Unit, which is constituted of a CPU, a ROM and a RAM which are connected by a bus line or the like). The vehicle 1 is further mounted with a velocity sensor 101, a 2-axis acceleration sensor 102, and a 1-axis gyro sensor 103 (hereinafter, it will be referred to as a yaw rate sensor where appropriately). The velocity sensor 101 outputs an output signal according to a roll axial velocity $v_{xc}(k)$ in the roll axis direction ($x_c$ direction). The 2-axis acceleration sensor 102 outputs an output signal according to a roll axial component $\alpha_{xc}(k)$ and a pitch axial component $\alpha_{yc}(k)$ (a component in $y_c$ direction) of an acceleration $\alpha$ of the vehicle 1. The 1-axis gyro sensor 103 outputs an output signal according an angular velocity $\omega_{zc}(k)$ around a yaw axis ($z_c$ axis) of the vehicle 1.

The vehicular control apparatus 10 controls a behavior of the vehicle 1 on the basis of a determination result by the vehicular behavior determination device 100 which includes a first arithmetic processor (operation processor) 110, a second arithmetic processor (operation processor) 120 and a third arithmetic processor (operation processor) 130. The first arithmetic processor 110 determines the roll axial velocity $v_{xc}(k)$, the roll axial component $\alpha_{xc}(k)$ and the pitch axial component $\alpha_{yc}(k)$ of the acceleration $\alpha$, and the angular velocity $\omega_{zc}(k)$ around the yaw axis of the vehicle 1, on the basis of the respective output signal from the velocity sensor 101, the 2-axis acceleration sensor 102 and the 1-axis gyro sensor 103. The second arithmetic processor 120 calculates a posture vector representing a posture of the vehicle 1 in the global coordinate system according to a posture operator on the basis of the determination result by the first arithmetic processor 110. The third arithmetic processor 130 calculates the angular velocity and the angular acceleration around the 3 axes of the vehicle 1, namely the roll axis, the pitch axis and the yaw axis, on the basis of the posture vector calculated by the second arithmetic processor 120 and the temporal variation of the posture vector. Each arithmetic processor is constituted from an arithmetic circuit, or a memory, and an arithmetic processing unit (operation processor, such as a CPU) which retrieves a program stored in the memory and performs an arithmetic processing (operation processing) according to the program. The determination result by the first arithmetic processor 110, the calculation result by the second arithmetic processor 120, and the calculation result by the third arithmetic processor 130 are stored respectively in a storing device such as a memory or the like.

Hereinafter, descriptions will be given to a vehicular behavior determination method performed by the vehicular behavior determination device 100 with the aforementioned configuration of the vehicle 1 in the first embodiment.

Figure 3:
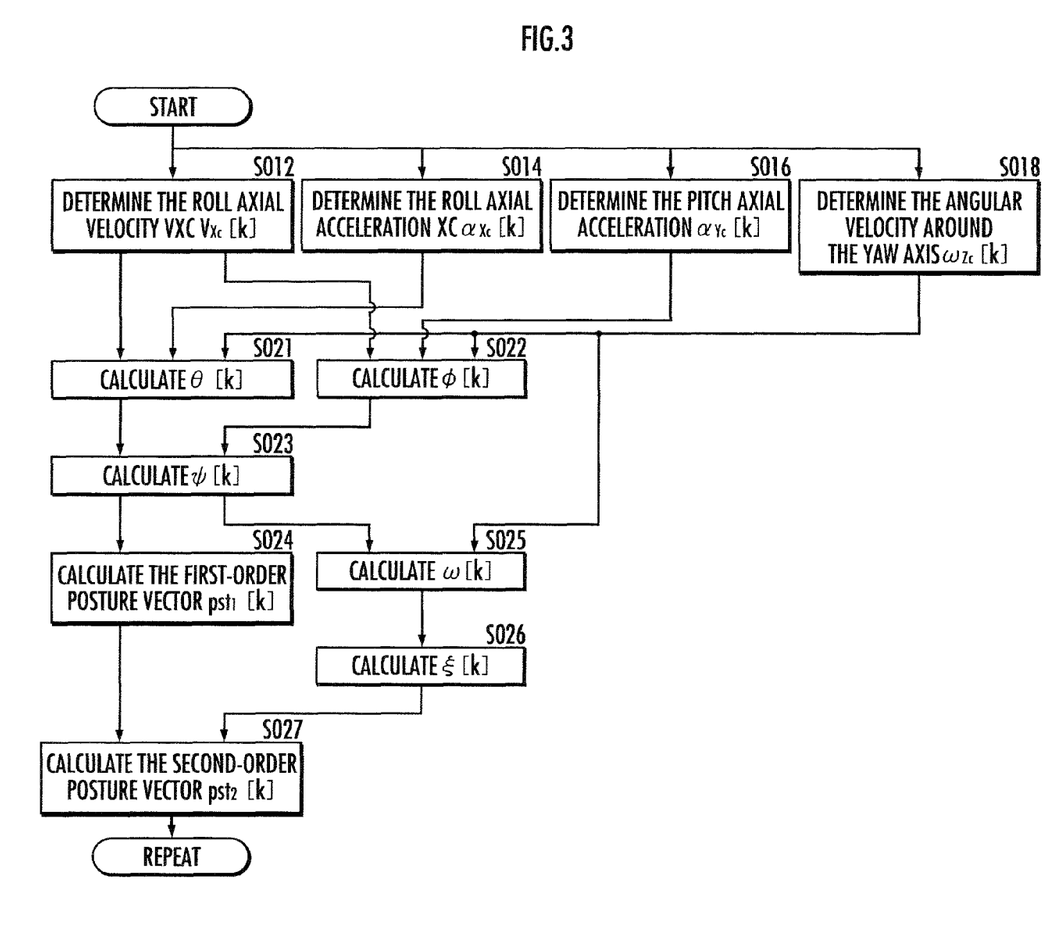
FIG. 3 is a flow chart illustrating a vehicular behavior determination method.

Firstly, the first arithmetic processor 110 performs a first processing which determines a parameter representing a behavior of the vehicle 1. Specifically, the first arithmetic processor 110 determines the roll axial velocity $v_{xc}(k)$ of the vehicle 1 at a timing k on the basis of the output signal from the velocity sensor 101 (FIG. 3/S012). The first arithmetic processor 110 determines the roll axial component $\alpha_{xc}(k)$ of the acceleration $\alpha$ of the vehicle 1 at the timing k (FIG. 3/S014) and the pitch axial component $\alpha_{yc}(k)$ of the acceleration $\alpha$ of the vehicle 1 at the timing k (FIG. 3/S016) on the basis of the output signal from the 2-axis acceleration sensor 102. The first arithmetic processor 110, on the basis of the output signal from the 1-axis gyro sensor 103, determines the angular velocity $\omega_{zc}(k)$ around the yaw axis of the vehicle 1 at the timing k (FIG. 3/S018).

Figure 5:
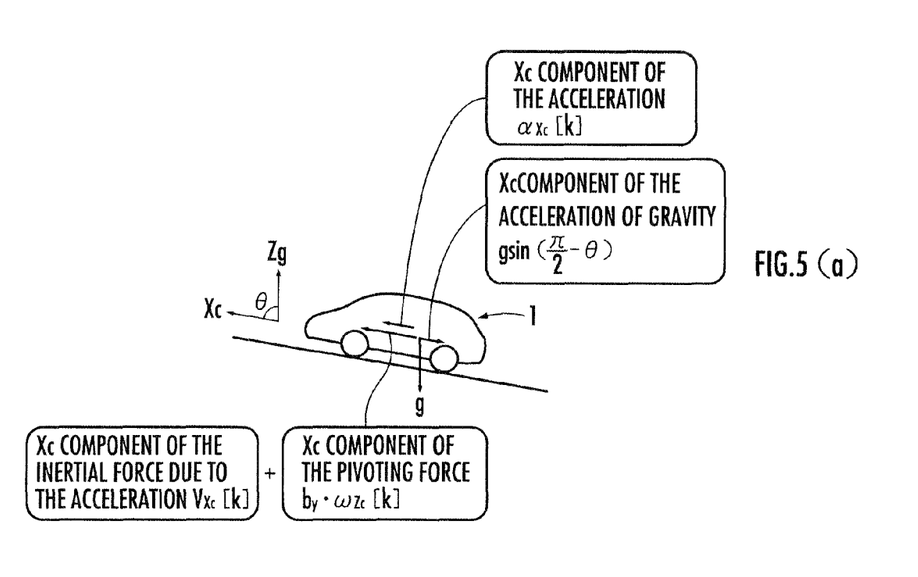
FIGS. 5(a) to 5(c) are explanatory diagrams illustrating a relation between a global coordinate system and a vehicular coordinate system, respectively.

Subsequently, the second arithmetic processor 120, on the basis of the determination results obtained by the first arithmetic processor 110, performs a second processing which calculates a posture vector representing the posture of the vehicle 1 in the global coordinate system. Specifically, the second arithmetic processor 120 calculates an inclined angle $\theta(k)$ in the $x_c$ direction of the vehicular coordinate system with respect to the $z_g$ direction of the global coordinate system at the timing k (FIG. 3/S021). The inclined angle $\theta(k)$ is calculated according to the equation (101) on the basis of the roll axial component $\alpha_{xc}(k)$ of the acceleration $\alpha$ of the vehicle 1 at the timing k, a temporal variation rate $v'_{xc}(k)$ of the roll axial velocity $v_{xc}(k)$ of the vehicle 1 at the timing k, a distance $l_y$ in y direction from a pivoting point to the 1-axis gyro sensor 103, and a temporal variation rate (angular acceleration) $\omega'_{zc}(k)$ of the angular velocity (yaw rate) $\omega_{zc}(k)$ around the yaw axis at the timing k. There is expressed in the equation (101) that the $x_c$ directional component $\alpha_{xc}(k)$ of the acceleration $\alpha$ of the vehicle 1, as illustrated in FIG. 5(a), is equal to a sum of a $x_c$ directional component of the gravity, the centrifugal force, and the inertial force and the pivoting force due to acceleration and deceleration, respectively (herein, the $x_c$ directional component of the centrifugal force is zero).

$$\theta(k) = \pi/2 - \arcsin((\alpha_{xc}(k) - v_{xc}'(k) - l_y \omega_{zc}'(k))/g)$$

$$v_{xc}'(k) = (v_{xc}(k) - v_{xc}(k-1))/\Delta t$$

$$\omega_{zc}'(k) = (\omega_{zc}(k) - \omega_{zc}(k-1))/\Delta t \tag{101}$$

Thereafter, the second arithmetic processor 120 calculates an inclined angle $\phi(k)$ in the $y_c$ direction in the vehicular coordinate system with respect to the $z_g$ direction in the global coordinate system at the timing k (FIG. 3/S022). The inclined angle $\phi(k)$ is calculated according to the equation (102) on the basis of the y directional component $\alpha_{yc}(k)$ of the acceleration $\alpha$ of the vehicle 1 at the timing k, the x directional component $v_{xc}(k)$ of the vehicle 1 at the timing k, a distance $l_x$ in the x direction from the pivoting point to the yaw rate sensor 103, the yaw rate $\omega_{zc}(k)$ at the timing k, and a temporal variation rate $\omega'_{zc}(k)$ of the yaw rate $\omega_{zc}(k)$ at the timing k. There is expressed in the equation (102) that the $y_c$ directional component $\alpha_{yc}(k)$ of the acceleration $\alpha$ of the vehicle 1, as illustrated in FIG. 5(b), is equal to a sum of a $y_c$ directional component of the gravity, the centrifugal force, and the inertial force and the pivoting force due to acceleration and deceleration, respectively (herein, the $y_c$ directional component of the inertial force due to the acceleration and deceleration is zero).

$$\phi(k)=\pi/2-\arcsin((\alpha_{yc}(k)-v_{xc}(k)\omega_{zc}(k)-l_x\omega_{zc}'(k))/g) \quad (102)$$

Next, the second arithmetic processor 120 calculates an inclined angle $\psi(k)$ in the $z_c$ direction in the vehicular coordinate system with respect to the $z_g$ direction in the global coordinate system at the timing k (FIG. 3/S023). The inclined angle $\psi(k)$ is calculated on the basis of a geometrical relationship illustrated in FIG. 5(c). Specifically, the $z_c$ directional inclined angle $\psi(k)$ is calculated according to the equation (103), on the basis of the $x_c$ directional inclined angle $\theta(k)$ and the $y_c$ directional inclined angle $\phi(k)$ of the vehicular coordinate system with respect to the $z_g$ direction in the global coordinate system at the timing k.

$$\psi(k)=\arcsin\sqrt{\cos^2\theta(k)+\cos^2\phi(k)} \quad (103)$$

Subsequently, the second arithmetic processor 120 calculates a first-order posture vector (represented by a quaternion) $pst_{1i}(k)$ (i=x, y, z) of the vehicle 1 according to the equation (104), on the basis of the above calculation results based on the determination results of the first arithmetic processor 110 and a first quaternion $qt_1(k)$ serving as a first rotational operator (FIG. 3/S024).

$$pst_{1i}(k) \equiv qt_1^*(k) \cdot pst_i(0) \cdot qt_1(k),$$

$$pst_x(0)=(1,0,0,0), pst_y(0)=(0,1,0,0), pst_z(0)=(0,0,1,0) \quad (104)$$

The first quaternion $qt_1(k)$ represents the rotation of the global coordinate system for matching the $z_g$ axis in the global coordinate system with the zc axis in the vehicular coordinate system. The rotation rotates around a unit normal vector $n_1=(n_{1x}, n_{1y}, n_{1z}, 0)$ of a plane containing the $z_g$ axis of the global coordinate system and the $z_c$ axis of the vehicular coordinate system. The first quaternion $qt_1(k)$ is expressed with the equation (105) on the basis of the inclined angle $\psi(k)$ in the $z_c$ direction of the vehicular coordinate system with respect to the $z_g$ direction of the global coordinate system at the timing k.

$$qt_1(k) \equiv (qt_{1x}(k), qt_{1y}(k), qt_{1z}(k), qt_{1w}(k)),$$

$$qt_{1x}(k)=n_{1x}(k)\sin(\psi(k)/2), qt_{1y}(k)=n_{1y}(k)\sin(\psi(k)/2),$$

$$qt_{1z}(k)=n_{1z}(k)\sin(\psi(k)/2), qt_{1w}(k)=\cos(\psi(k)/2) \quad (105)$$

Figure 6:
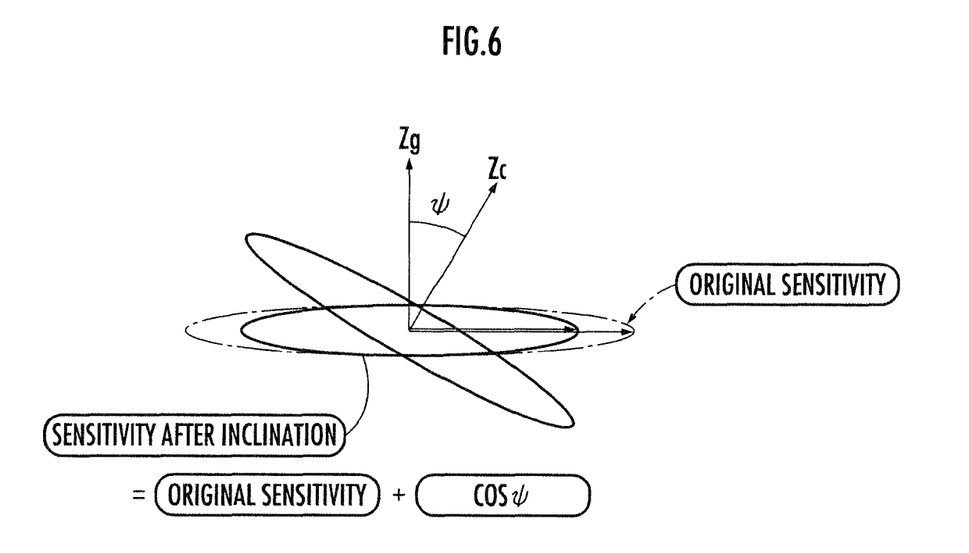
FIG. 6 is an explanatory diagram illustrating a correction of a yaw rate.

Further, the second arithmetic processor 120 calculates a yaw rate $\omega_{zg}(k)$ around the $z_g$ axis of the vehicle 1 in the global coordinate system (FIG. 3/S025). As illustrated in FIG. 6, if the yaw axis or the $z_c$ direction of the vehicular coordinate system is inclined at the inclined angle $\psi(k)$ from the $z_g$ direction of the global coordinate system, the sensitivity of the yaw rate sensor 103 is reduced by $\cos\psi(k)$. Thereby, the (original) yaw rate $\omega_{zg}(k)$ around the $z_g$ axis of the vehicle 1 in the global coordinate system is calculated by correcting the yaw rate $\omega_{zc}(k)$ around the $z_c$ axis based on the output of the yaw rate sensor 103 on the basis of the inclined angle $\psi(k)$ in the $z_c$ direction in the vehicular coordinate system with respect to the $z_g$ direction in the global coordinate system according to the equation (106).

$$\omega_{zg}(k)=\omega_{zc}(k)/\cos\psi(k) \quad (106)$$

Thereafter, the second arithmetic processor 120 calculates an inclined angle $\xi(k)$ in the $x_c$ direction in the vehicular coordinate system with respect to the $x_g$ direction in the global coordinate system at the timing k (FIG. 3/S026). The inclined angle $\xi(k)$ is calculated according to the equation (107), on the basis of the inclined angle $\xi(k-1)$ at a previous timing "k-1" ($\xi(0)=0$), and the angular velocity $\omega_{gz}(k)$ of the vehicle 1 at the timing k.

$$\xi(k)=\xi(k-1)+\omega_{gz}(k)\times\Delta t \quad (107)$$

Subsequently, the second arithmetic processor 120 calculates a second-order posture vector (represented by a quaternion) $pst_{2i}(k)$ (i=x, y, z) as an $i^{th}$ posture vector $pst_i(k)$ representing the posture of the vehicle 1 in the global coordinate system according to the equation (108), on the basis of the above calculation results of the first-order posture vector $pst_{1i}(k)$ and the like based on the determination result of the first arithmetic processor 110, and a second quaternion $qt_2(k)$ as a second rotational operator (FIG. 3/S027). The $i^{th}$ posture vector $pst_i(k)$ corresponds to a unit vector in the global coordinate system which represents a direction of an i axis in the vehicular coordinate system. Note that it is acceptable to calculate the $i^{th}$ posture vector $pst_i(k)$ at one time according to a composite quaternion $qt(k)=qt_1(k)*qt_2(k)$, instead of calculating the first-order posture vector $pst_{1i}(k)$ and the second vector $pst_{2i}(k)$ sequentially.

$$pst_{2i}(k) \equiv qt_2^*(k) \cdot pst_{1i}(0) \cdot qt_2(k) \quad (108)$$
$$= qt_2^*(k) \cdot qt_1^*(k) \cdot pst_i(0) \cdot qt_1(k) \cdot qt_2(k)$$
$$(i=x, y, z)$$

The second quaternion $qt_2(k)$ represents a rotation of the global coordinate system for matching the $x_g$ axis and the $y_g$ axis in the global coordinate system with the $x_c$ axis and $y_c$ axis in the vehicular coordinate system, respectively. The rotation rotates around a unit vector (0, 0, 1, 0) in the $z_g$ direction of the global coordinate system. The second quaternion $qt_2(k)$ is expressed by the equation (109) on the basis of the inclined angle $\xi(k)$ in the $x_c$ direction of the vehicular coordinate system with respect to the $x_g$ direction of the global coordinate system at the timing k.

$$qt_2(k) \equiv (qt_{2x}(k), qt_{2y}(k), qt_{2z}(k), qt_{2w}(k)),$$

$$qt_{2x}(k)=0, qt_{2y}(k)=0,$$

$$qt_{2z}(k)=\sin(\xi(k)/2), qt_{2w}(k)=\cos(\xi(k)/2) \quad (109)$$

Figure 4:
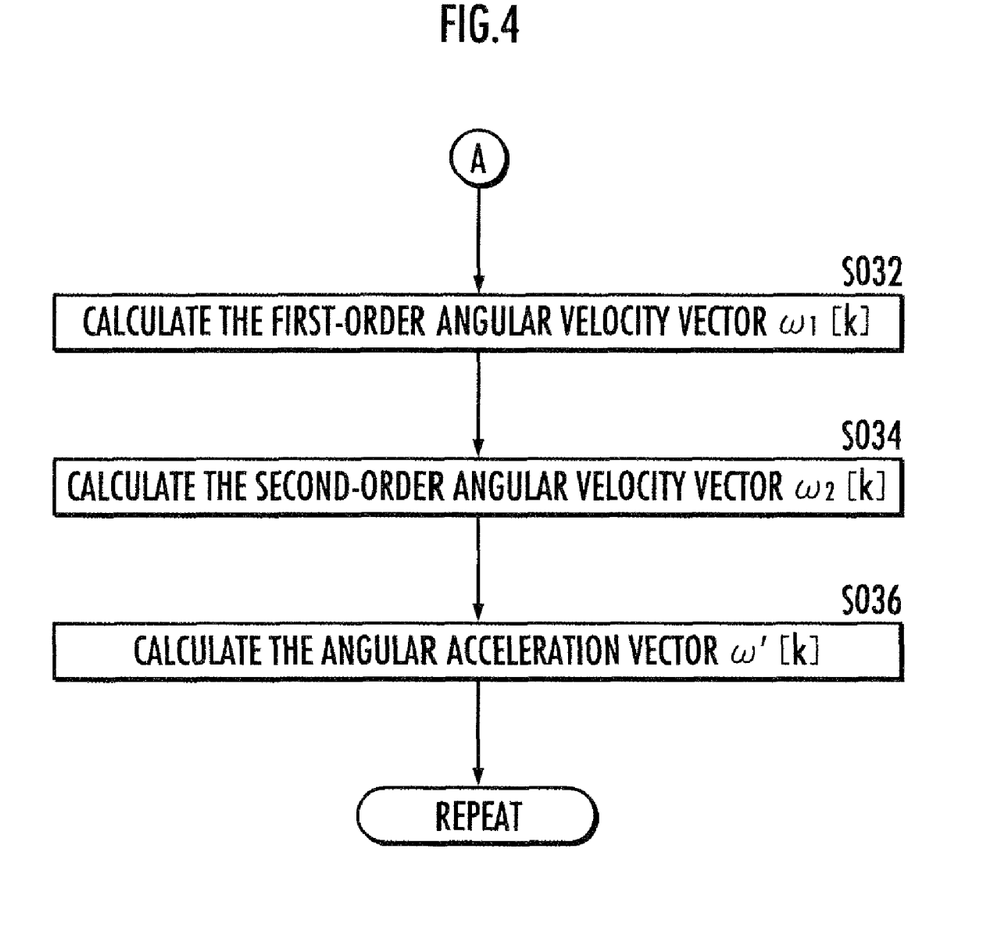
FIG. 4 is flow chart illustrating the vehicular behavior determination method.

Further, the third arithmetic processor 130 performs a third processing which determines an angular velocity and the like of the vehicle 1 around each of the 3 orthogonal axes in the vehicular coordinate system, on the basis of the calculation results by the second arithmetic processor 120. Firstly, the third arithmetic processor 130 calculates a first-order angular velocity vector $\omega_1(k)$ which represents the angular velocity of the vehicle 1 around each of the 3 orthogonal axes in the global coordinate system on the basis of the temporal variation mode of the $i^{th}$ posture vector $pst_i(k)$ (FIG. 4/S032). Specifically, a rotational main axis vector $n_2(k)$ is calculated according to the equation (110). The rotational main axis vector $n_2(k)$ shows a direction of a rotational main axis in the global coordinate system and causes a previous posture vector $pst_{1,i}(k-1)$ at the timing $t=k-1$ to match with a current posture vector $pst_i(k)$ at the timing $t=k$.

$$n_2(k) = \Sigma_{i=x,y,z}(pst_i(k-1) \times pst_i(k))/|pst_i(k-1) \times pst_i(k)| \quad (110)$$

Figure 7:
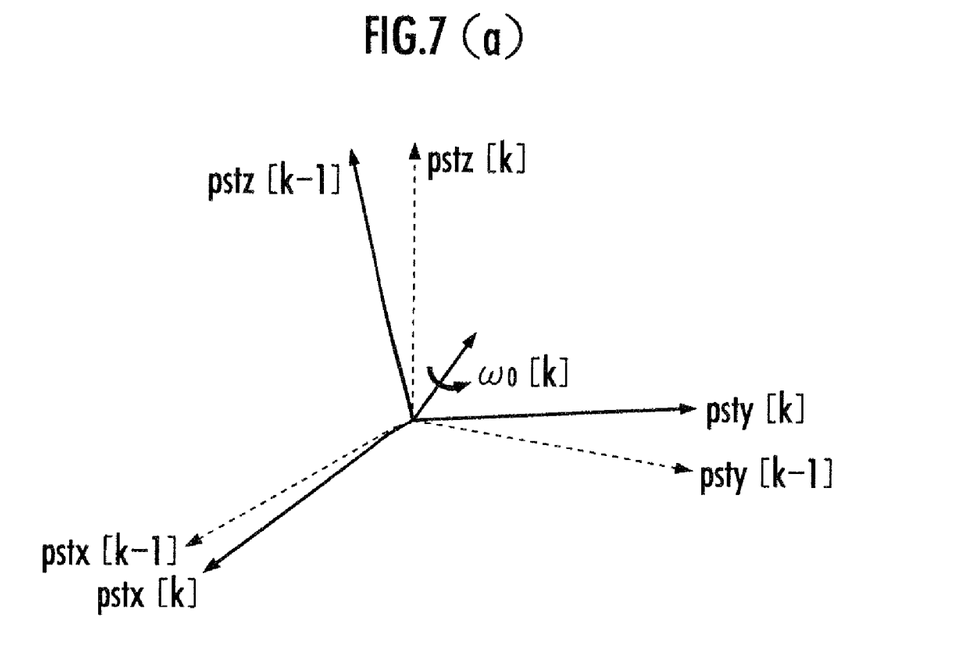
FIGS. 7(a) and 7(b) are explanatory diagrams illustrating a calculation method of an angular velocity vector.

Based on the above, the first-order angular velocity vector $\omega_1(k)$ is calculated according to the equation (111), on the basis of a rotation angle $\Theta_1(k)$ of the posture vector $pst_i(k)$ around the rotational main axis $n_2(k)$, as illustrated in FIG. 7(a).

$$\omega_1(k) = (\omega_{1x}(k), \omega_{1y}(k), \omega_{1z}(k), 0) \quad (111)$$
$$= \omega_n(k)(n_{2x}(k), n_{2y}(k), n_{2z}(k), 0),$$
$$\omega_n(k) = \Theta(k)/\Delta t,$$
$$\Theta(k) = avg(\Theta_i(k)), \max(\Theta_i(k)) \text{ or } \min(\Theta_i(k)),$$
$$\Theta_i(k) = \arccos\{n_2(k) \times pst_i(k-1)) \cdot (n_2(k) \times pst_i(k))\}$$

Wherein, "$avg(\Theta_i(k))$" refers to an average value of 2 or 3 rotation angles ("0" is excluded) among the rotation angle $\Theta_i(k)$ around the rotational main axis of the $i^{th}$ posture vector $pst_i(k)$ ($i=x(=1)$, $y(=2)$, $z(=3)$); "$\max(\Theta_i(k))$" refers to the maximum value of the three rotation angle $\Theta_i(k)$; and "$\min(\Theta_i(k))$" refers to the minimum value of the three rotation angle $\Theta_i(k)$ ("0" is excluded).

Thereafter, the third arithmetic processor 130 calculates a second-order angular velocity vector $\omega_2(k)$ which represents an angular velocity of the vehicle 1 around each of the 3 orthogonal axes in the vehicular coordinate system as the angular velocity vector $\omega(k)$ (FIG. 4/S034) according to the equation (112), on the basis of the first-order angular velocity vector $\omega_1(k)$ and the $i^{th}$ posture vector $pst_i(k)$ which represents the posture of the vehicle 1 in the global coordinate system.

$$\omega_2(k) = (\omega_{2x}(k), \omega_{2y}(k), \omega_{2z}(k), 0) \quad (112)$$
$$\omega_{2i}(k) = pst_i^*(k)\omega_1(k)pst_i(k)$$
$$= qt_2^*(k)qt_1^*(k)\omega_1(k)qt_1(k)qt_2(k)$$

The composite quaternion $qt_1(k) qt_2(k)$ of the first quaternion $qt_1(k)$ and the second quaternion $qt_2(k)$ used in calculating the angular velocity vector $\omega(k)$ represent a rotation or coordinate transfer of the global coordinate system for making the global coordinate system and the vehicular coordinate system match each other, as mentioned above.

Further, the third arithmetic processor 130 calculates an angular acceleration vector $\omega'(k)$ according to the equation (114) on the basis of the previous angular velocity vector $\omega(k-1)$ at timing $t=k-1$ and the current angular velocity vector $\omega(k)$ at timing $t=k$.

$$\omega'(k) = (\omega(k) - \omega(k-1))/\Delta t \quad (114)$$

The aforementioned process is repeated, thereby the angular velocity vector $\omega(k)$ and the angular acceleration vector $\omega'(k)$ around each of the 3 orthogonal axes, namely the roll axis, the pitch axis and the yaw axis is calculated or determined sequentially.

Hereinafter, descriptions will be given regarding a vehicular behavior determination device 100 of a second embodiment. The vehicular behavior determination device 100 of the second embodiment has the same configuration in hardware as the vehicular behavior determination device 100 of the first embodiment (refer to FIGS. 1 and 2), however differs in contents of the second arithmetic processing and the third arithmetic processing. In detail, firstly, the first arithmetic processor 110 performs the first arithmetic processing, which is equivalent to that in the first embodiment (refer to FIG. 3/S012 to S018).

Next, similar to that in the first embodiment, the second arithmetic processor 120 calculates the inclined angles $\theta(k)$, $\phi(k)$ and $\psi(k)$ of the $x_c$ direction, $y_c$ direction and $z_c$ direction in the vehicular coordinate system with respect to the $z_g$ direction, respectively, (refer to FIG. 3/S021 to S023). Thereafter, the second arithmetic processor 120 calculates the first-order posture vector $pst_1(k)$ according to the equation (204) on the basis of the first quaternion $qt_1(k)$ (refer to the equation (105) and FIG. 3/S024). Although the coefficient $c_i$ may be set arbitrarily, it is set herein under a constraint condition that the first-order posture vector $pst_1(k)$ becomes a unit vector.

$$pst_1(k) \equiv \Sigma_{i=x,y,z} c_i qt_1^*(k) pst_i(0) qt_1(k) \quad (204)$$

Subsequently, the second arithmetic processor 120 calculates the second-order posture vector $pst_2(k)$ as the posture vector $pst(k)$ according to the equation (208) by using the second quaternion $qt_2(k)$, on the basis of the first-order posture vector $pst_1(k)$ (refer to FIG. 3/S025 to S027).

$$pst_{2i}(k) \equiv qt_2^*(k) pst_{1i}(k) qt_2(k) \quad (108)$$
$$= qt_2^*(k) qt_1^*(k) pst_i(0) qt_1(k) qt_2(k)$$
$$(i = x, y, z)$$

Further, the third arithmetic processor 130 calculates a preliminary angular velocity $\omega_0(k)$ which represents the angular velocity around the rotational main axis of the posture vector $pst(k)$ (refer to FIG. 4/S032). Specifically, as illustrated in FIG. 7(b), the preliminary angular velocity $\omega_0(k)$, which represents the angular velocity around the rotational main axis of the posture vector $pst(k)$, is calculated according to the equation (210) on the basis of a variation rate $\theta(k)/\Delta t$ of the angle $\theta(k)$ formed between the posture vector $pst(k-1)$ at a timing "$k-1$" and the posture vector $pst(k)$ at another different timing $k$. The preliminary angular velocity $\omega(k)$, as illustrated in FIG. 7(b), is defined as a 3 dimensional vector in a rotation coordinate system having the posture vector $pst(k-1)$ at the timing "$k-1$" as a unit toward the positive direction in $x_n$ axis and a normal line of a plane including the posture vector $pst(k-1)$ and $pst(k)$ at two different timings "$k-1$" and $k$ respectively as the $z_n$ axis (rotational main axis)

$$\omega_0(k) = (0, 0, \theta(k)/\Delta t, 0), \quad (210)$$
$$\theta(k) = \arccos(pst(k-1) \cdot pst(k+1))$$
$$= \arccos\left(\sum_{i=x,y,z} pst_i(k-1) \cdot pst_i(k)\right)$$

The third arithmetic processor 130 calculates the first angular velocity $\omega_1(k)$ representing the angular velocity around each of the 3 axes of the posture vector in the global coordinate system according to the equation (211) on the basis of the preliminary angular velocity vector $\omega_0(k)$ and the posture in the global coordinate system in a plane including the two posture vectors $pst(k-1)$ and $pst(k)$.

$$\omega_1(k) \equiv qt_3^*(k) \omega_0(k) qt_3(k) \quad (211)$$

The third quaternion $qt_3(k)$ represents the rotation of $z_n$ axis in the rotation coordinate system for causing the $z_n$ axis in the rotation coordinate system to match with the $z_g$ axis in the global coordinate system. The rotation rotates around a unit normal vector $n_3=(n_{3x}, n_{3y}, n_{3z})$ of a plane containing the $z_n$ axis of the rotation coordinate system and the $z_g$ axis of the global coordinate system. The third quaternion $qt_3(k)$ is expressed in the equation (212) on the basis of the inclined angle $\eta(k)$ in the $z_c$ direction of the vehicular coordinate system with respect to the $z_g$ direction of the global coordinate system at the timing k.

$$qt_3(k) \equiv (qt_{3x}(k), qt_{3y}(k), qt_{3z}(k), qt_{3w}(k)),$$

$$qt_{3x}(k) = n_{3x}(k)\sin(\eta(k)/2),\ qt_{3y}(k) = n_{3y}(k)\sin(\eta(k)/2),$$

$$qt_{3z}(k) = n_{3z}(k)\sin(\eta(k)/2),\quad qt_{3w}(k) = \cos(\eta(k)/2) \quad (212).$$

Thereafter, the third arithmetic processor 130, similar to the first embodiment, calculates the angular velocity vector $\omega(k)$ and the angular acceleration vector $\omega'(k)$ representing the angular velocity around each of the 3 axes of the posture vector $pst(k)$ in the vehicular coordinate system (refer to the equations (112) and (114), FIG. 4/S036 and). By repeating the aforementioned processing, the angular velocity and the angular acceleration around each of the 3 axes, namely the roll axis, the pitch axis and the yaw axis of the vehicle 1 are calculated or determined sequentially.

According to the vehicular behavior determination device performing the above-mentioned functions, the angular velocity vector $\omega(k)$ representing the angular velocity around each of the 3 axes of the vehicle 1 is determined on the basis of the temporal variation mode of the $i^{th}$ posture vector $pst_i(k)$ (the first embodiment) or the posture vector $pst(k)$ (the second embodiment) representing the posture of the vehicle 1 in the global coordinate system without using a 3-axis gyro sensor which is relatively expensive in price and large in size so as to curtail the manufacture cost and size of the vehicle 1 (refer to FIG. 4/S032 and S034, FIGS. 7(a) and 7(b)). Moreover, the angular acceleration vector $\omega'(k)$ around each of the 3 axes of the vehicle 1 may be determined in high accuracy on the basis of the angular velocity vector $\omega(k)$ (refer to FIG. 4/S036).

Further, it is acceptable to express the posture vector and the angular velocity vector which represent the posture of the vehicle 1 in the global coordinate system with a 3 dimensional vector which is mathematically equivalent to the quaternion as an alternate to the quaternion. It is also acceptable to use a matrix which is mathematically equivalent to the quaternion as the posture operator as an alternate to the quaternion in determining the posture of the vehicle 1. Specifically, a posture vector $P(k)$ of the vehicle 1 at the timing k is estimated according to the equation (132) by using a first rotation matrix $Q_1(k)$ and a second rotation matrix $Q_2(k)$.

$$P(k) = (P_x(k), P_y(k), P_z(k)) = Q_2(k) \cdot Q_1(k) \cdot P(0),$$

$$P_i(k) = {}^t(p_{i1}(k), p_{i2}(k), p_{i3}(k)),$$

$$P_x(0) = {}^t(1,0,0),\ P_y(0) = {}^t(0,1,0),\ P_z(k) = {}^t(0,0,1) \quad (132)$$

(Wherein, a matrix with a subscript "t" refers to a transposed matrix.)

The first rotation matrix $Q_1(k)$ represents a rotation around the $y_g$ axis in the global coordinate system for causing the $z_g$ axis in the global coordinate system to match with the $z_c$ axis in the vehicular coordinate system. The first rotation matrix $Q_1(k)$ is expressed by the equation (134).

$$Q_1(k) \equiv (Q_{11}(k), Q_{12}(k), Q_{13}(k)),$$

$$Q_{11} = {}^t(1-2(qt_{1y}^2 + qt_{1z}^2), 2(qt_{1x}qt_{1y} - qt_{1z}qt_{1w}), 2(qt_{1z}qt_{1x} + qt_{1w}qt_{1y})),$$

$$Q_{12} = {}^t(2(qt_{1x}qt_{1y} + qt_{1z}qt_{1w}), 1 - 2(qt_{1z}^2 + qt_{1x}^2), 2(qt_{1y}qt_{1x} - qt_{1w}qt_{1x})),$$

$$Q_{13} = {}^t(2(qt_{1z}qt_{1x} - qt_{1w}qt_{1y}), 2(qt_{1y}qt_{1z} + qt_{1w}qt_{1x}), 1 - 2(qt_{1y}^2 + qt_{1z}^2)) \quad (134)$$

The second rotation matrix $Q_2(k)$ represents a rotation around the $z_g$ axis in the global coordinate system for causing the $x_g$ axis and $y_g$ axis in the global coordinate system to match with the $x_c$ axis and $y_c$ axis in the vehicular coordinate system, respectively. The second rotation matrix $Q_2(k)$ is expressed by the equation (136) on the basis of the inclined angle $\xi(k)$ in the $x_c$ direction in the vehicular coordinate system with respect to the $x_g$ direction in the global coordinate system at the timing k.

$$Q_2(k) \equiv (Q_{21}(k), Q_{22}(k), Q_{23}(k)),$$

$$Q_{21} = {}^t(\cos\xi(k), -\sin\xi(k), 0),$$

$$Q_{22} = {}^t(\sin\xi(k), \cos\xi(k), 0),$$

$$Q_{23} = {}^t(0,0,1) \quad (136)$$

According to the present embodiment, similar to that in the previous embodiment, the posture of the vehicle 1 can be estimated in high accuracy without using a 3-axis gyro sensor which is relatively expensive in price and large in size in an attempt to curtail the manufacture cost and size of the vehicle 1.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

What is claimed is:

1. A vehicular behavior determination device which determines a behavior of a vehicle, comprising:
   a first arithmetic processor, which determines a parameter representing the behavior of the vehicle;
   a second arithmetic processor, which calculates a posture vector representing a posture of the vehicle in a global coordinate system on the basis of a determination result determined by the first arithmetic processor; and
   a third arithmetic processor, which calculates an angular velocity vector representing an angular velocity of the vehicle around each of 3 orthogonal axes in a vehicular coordinate system on the basis of a temporal variation mode of the posture vector calculated by the second arithmetic processor;
   wherein the second arithmetic processor calculates an $i^{th}$ posture vector (i=1, 2, 3) which represents a posture of each of the 3 orthogonal axes of the vehicular coordinate system in the global coordinate system as the posture vector; and
   the third arithmetic processor obtains a rotational main axis vector which represents a direction of a rotational main axis in the global coordinate system by combining 3 rotational axis vectors for making a previous $i^{th}$ posture vector match with a current $i^{th}$ posture vector, calculates a first-order angular velocity vector which represents an angular velocity of the vehicle around each of the 3 orthogonal axes in the global coordinate system on the basis of the obtained rotational main axis vector, the previous $i^{th}$ posture vector and the current $i^{th}$ posture vector, and thereafter calculates a second-order angular velocity vector which represents the angular velocity of the vehicle around each of the 3 orthogonal axes in the vehicular coordinate system as the angular velocity vector on the basis of the first-order angular velocity vector and the $i^{th}$ posture vector.

2. The vehicular behavior determination device according to claim 1, wherein the third arithmetic processor calculates an angular acceleration vector which represents an angular acceleration of the vehicle around each of the 3 orthogonal axes in the vehicular coordinate system on the basis of the temporal variation mode of the angular velocity vector.

3. The vehicular behavior determination device according to claim 1, wherein the third arithmetic processor calculates an angular acceleration vector which represents an angular acceleration of the vehicle around each of the 3 orthogonal axes in the vehicular coordinate system on the basis of the temporal variation mode of the angular velocity vector.

4. A vehicular behavior determination method of determining a behavior of a vehicle, comprising steps of:
   a first arithmetic processing for determining a parameter representing the behavior of the vehicle;
   a second arithmetic processing for calculating a posture vector representing a posture of the vehicle in a global coordinate system on the basis of a determination result determined by the first arithmetic processing; and
   a third arithmetic processing for calculating an angular velocity vector representing an angular velocity of the vehicle around each of 3 orthogonal axes in a vehicular coordinate system on the basis of a temporal variation mode of the posture vector calculated by the second arithmetic processing;

wherein the second arithmetic processing comprises calculating an $i^{th}$ posture vector (i=1, 2, 3) which represents a posture of each of the 3 orthogonal axes of the vehicular coordinate system in the global coordinate system as the posture vector; and the third arithmetic processing comprises obtaining a rotational main axis vector which represents a direction of a rotational main axis in the global coordinate system by combining 3 rotational axis vectors for making a previous $i^{th}$ posture vector match with a current $i^{th}$ posture vector, calculating a first-order angular velocity vector which represents an angular velocity of the vehicle around each of the 3 orthogonal axes in the global coordinate system on the basis of the obtained rotational main axis vector, the previous $i^{th}$ posture vector and the current $i^{th}$ posture vector, and thereafter calculating a second-order angular velocity vector which represents the angular velocity of the vehicle around each of the 3 orthogonal axes in the vehicular coordinate system as the angular velocity vector on the basis of the first-order angular velocity vector and the $i^{th}$ posture vector.

5. The vehicular behavior determination device according to claim 1, wherein the parameter is one or more of a roll axis velocity in the roll axis direction, a roll axial component of acceleration of the vehicle, a pitch axial component of acceleration of the vehicle, and an angular velocity around the yaw axis of the vehicle.

* * * * *